Feb. 25, 1964 R. T. BURNETT ETAL 3,122,222
COMBINATION AUTOMATIC ADJUSTER AND DEFLECTION
ABSORBING MECHANISM
Filed Sept. 22, 1960

INVENTORS
RICHARD T. BURNETT
JOSEPH L. MOSSEY
BY
John A. Young
ATTORNEY

United States Patent Office 3,122,222
Patented Feb. 25, 1964

3,122,222
COMBINATION AUTOMATIC ADJUSTER AND
DEFLECTION ABSORBING MECHANISM
Richard T. Burnett and Joseph Lloyd Mossey, South Bend, Ind., assignors to The Bendix Corporation, South Bend, Ind., a corporation of Delaware
Filed Sept. 22, 1960, Ser. No. 58,600
3 Claims. (Cl. 188—196)

The invention relates to an automatic adjuster for a friction element or friction elements of a brake or the like, the purpose of the invention being to maintain an established running clearance of each friction element from a rotor throughout the wear life of the friction element. More particularly the invention relates to a new and improved automatic adjuster which is adapted to resiliently yield upon deflections of the rotor and to return to its initial condition when the rotor returns to its shape, whereby a constant clearance is maintained.

The usual automatic adjusters for brakes are subject to serious disadvantages in that the proper running clearance may be disturbed by rotor deflection. Such adjusters generally employ a friction coupling associated with a lost motion connection so that the rest position of the element to be adjusted is displaced in the direction corresponding to the taking-up of wear when the clearance exceeds the lost motion of the connection. Unfortunately the element to be adjusted will "slip" back when it is subjected to a shock whose amplitude is large enough to bring back the element by an amount higher than the lost motion; such shocks are likely to occur for instance when the vehicle is cornering on a rough road.

This shortcoming is particularly acute when the adjuster is used in a disk brake with straight physical action where the running clearance should be as short as possible and where the disk is prone to lateral movements and deflections of large amplitude. It is the general object of the invention to overcome the foregoing and other difficulties by the provision of a combination automatic adjuster and deflection absorbing mechanism whereby temporary deflections of the disk in excess of the running clearance are allowed by a resilient assembly which re-establishes the normal clearance as soon as the disk deflection ceases.

Another object of the invention is to provide an automatic adjuster device which maintains a constant clearance throughout all the wear life of the friction pads which is unaltered by deflection of the parts.

It is still another object of the invention to provide automatic adjuster which will insure positive return of the element to be adjusted by means of a retracting spring which will be subjected to constant stress throughout the wear of the friction element.

Still another object of the invention is to provide an automatic adjuster which may be rendered inoperative in order to bring it back into initial condition, for instance when the friction pads are to be replaced.

It is a further object of the invention to provide a combination adjuster and deflection absorbing mechanism for use in conjunction with a fluid pressure motor which enables full utilization of the pistion area for actuating the motor.

Other features and objects of the invention will become apparent from the following description which refers to the accompanying drawing, wherein an embodiment of the invention is shown by way of example; in the drawing.

The invention will be described in conjunction with a disk brake in which a friction pad 16 is forced into engagement with a rotatable disk by a piston movable in a hydraulic cylinder. It will be understood that the device may be used for other types of brakes, for clutches and generally for any device in which it is desired to adjust the relative position of two members in response to wear.

Figure 1:
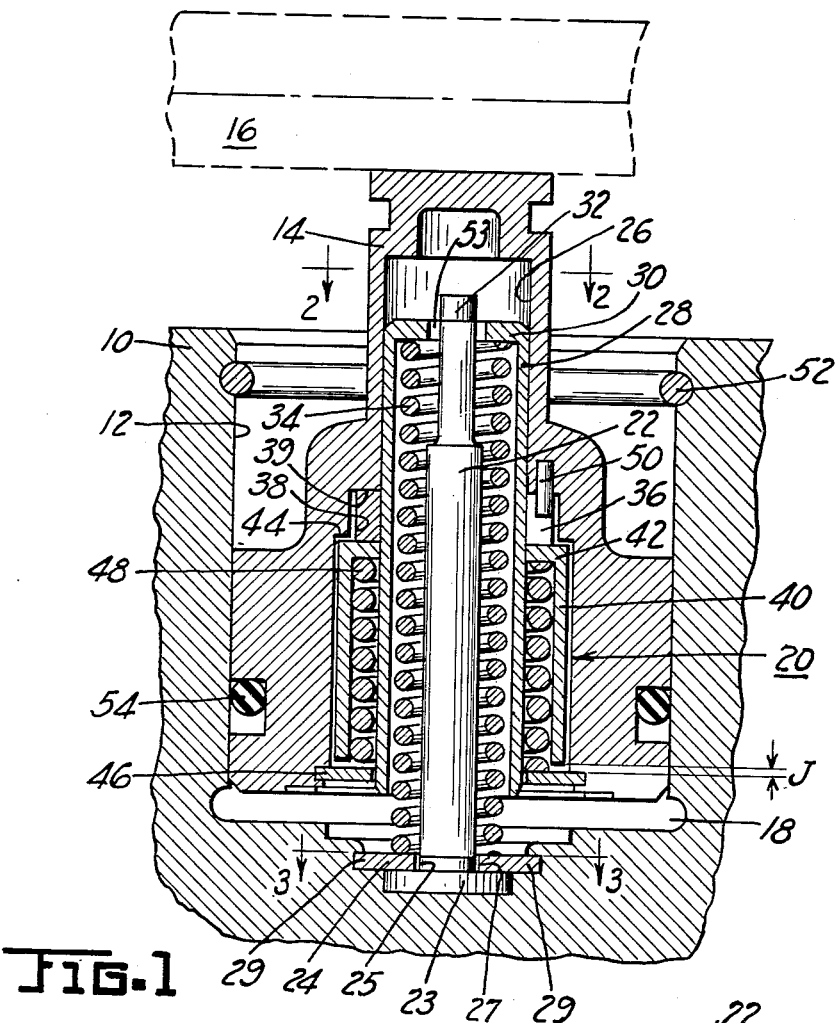
FIGURE 1 is a sectional view of a fluid pressure brake applying mechanism and automatic adjuster according to the invention.

Referring to FIGURE 1, a fluid motor mounted in a housing or carrier member 10 includes a pressure responsive piston 14 which is slidable in a cylinder bore 12. A fluid chamber 18 is formed between the piston and the end wall of the cylinder and fluid pressure may be admitted to the chamber through an inlet to displace the piston 14 upward and apply the brake. The piston 14 is engageable with a friction pad 16 (shown in dash-dot lines on FIGURE 1) fixed against circumferential movement. The piston 14 is adapted to force the pad 16 into engagement with a flat face of a disk which turns with a wheel or some other rotatable part of the vehicle. If the disk brake is of the "sliding saddle" type, such as that shown in U.S. application Serial No. 680,782, filed August 28, 1957, now Patent No. 3,035,664, in the names of Jean Lucien Desvignes and Pierre Gancel, the pressure force on the end wall of the cylinder is transmitted to another pad and forces it against another flat face of the disk which it confronts. If the brake is of the "fixed caliper" type, at least one separate cylinder carried by the caliper, such as that shown in U.S. application Serial No. 726,885, filed April 7, 1958, now abandoned, in the names of Jean Lucien Desvignes and Pierre Gancel located on the opposite side of the disk and in communication with the first cylinder is provided to apply the other pad.

Figure 2:
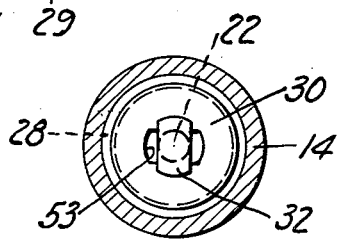
FIGURE 2 is a sectional view taken on line 2—2 of FIGURE 1.
Figure 3:
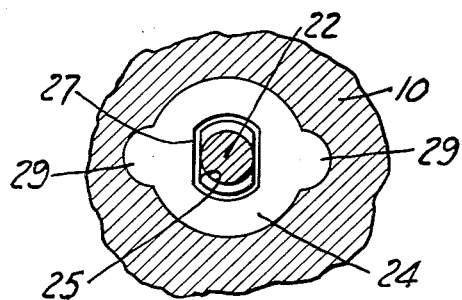
FIGURE 3 is a sectional view taken on line 3—3 of FIGURE 1.

The automatic adjuster device operatively connects the housing and piston and in designated as a whole by the reference numeral 20. The device 20 includes an elongated stem 22 which has a boss 23 at one end. The boss 23 is contacted by a washer 24 to hold the stem 22 against a shoulder of the cylinder end wall. The washer 24 is secured in any suitable way to the cylinder end wall, for instance by crimped portions of the end wall. The stem has flats 25 received through an opening 27 also having flats to prevent rotation between the stem 22 and washer 24 which is held by rounded projections 29 within recesses of carrier member 10. The free end of the elongated stem 22 projects into a stepped inner bore 26 of the piston 14. The smaller diameter portion of bore 26 slidably receives a piston positioning sleeve 28 which has a terminal, radially inwardly directed flange 30. The terminal flange 30 is resiliently forced by yieldable means against a stop provided on the end of stem 22. The stop may be in the nature of a rectangular boss 32 (FIGURES 1 and 2) or of any device limiting upward displacement of the sleeve 28 with respect to the stem 22 to a predetermined position. The yieldable means is formed as a deflection absorbing spring 34 which is compressed between the washer 24 and the radial flange 30 of the sleeve to force the flange of the sleeve 28 into engagement with the boss 32.

The sleeve is coupled to the piston by a split friction ring 36 which grips the outer surface of the piston positioning sleeve 28. The friction ring 36 is maintained against the radial wall 39 of a counterbore 38 of the inner bore 26 by a force transmitting tubular member 40 coaxial with and movable with respect to the sleeve 28, the tubular member 40 also including an inner flange 42 formed at the upper end of the tubular member 40 which also bears against the friction ring 36 in the released position of the brake.

A thrust washer 46 is secured to the piston at the open end of bore 26 and the distance between the confronting end surfaces of the tubular member 40 and thrust washer 46 equals the clearance "j" which provides a lost motion for the piston. A return spring 48 is compressed between the inner flange 42 of the tubular member 40 and the thrust washer 46. A pin 50 anchored in a blind opening formed in the end wall of counterbore 38 projects into the slot of the split friction ring for purposes to be explained hereafter.

As a safety measure a snap ring 52 is located in a groove at the opening of cylinder bore 12 and prevents a mechanic from accidentally removing the piston when servicing the brake, which would result in a need for refilling and bleeding the hydraulic system. The hydraulic chamber is sealed by means of a O-ring 54 located in a groove of the piston 14 and bearing against the lateral wall of the cylinder bore 12.

In operation, fluid pressure is delivered to the pressure chamber 18 from a control valve, or from a manual or power assisted master cylinder, thus moving the piston 14 upwardly. The friction pad 16 is forced into frictional engagement with a rotative disk (not shown).

As the piston moves upwardly, the thrust washer 46 is also moved herewith and the return spring 48 is thereby compressed. No other part is displaced as long as washer 46 moving through the lost motion distance "j" has not engaged the tubular member 40. If the amount of displacement of the piston from rest does not exceed the distance "j" (FIGURE 1), the tubular member 40 is fixed against axial movement by the friction ring 36 gripping the sleeve 28. For this purpose, the gripping force of friction ring 36 on the sleeve 28 should obviously be designed stronger than the compression of the return spring 48.

If the friction pad has worn so that the clearance of the brake is in excess of the distance "j," the piston will continue to move relatively to the sleeve 28 to force the friction pad or pads into engagement with the disk. The thrust washer 46 engages the tubular member 40 and, upon continued movement of the piston, will move the tubular member against the frictional resistance of friction ring 36 since the hydraulic force on the piston is far in excess of the gripping force of the friction ring. The tubular member pushes the friction ring 36 along the length of sleeve 28 to a new position corresponding to the engagement of the friction pad 16 with the disk.

When the applying pressure in the pressure chamber 18 is released, the return spring 48 acting through the thrust washer 46 will push the piston downwardly until the friction ring re-engages the end wall 39 of counterbore 38. This retractile movement of the piston 14 is equal to the distance "j," even though the piston might have been displaced on a greater length during the preceding brake application. It is to be noted that the return force of the spring 48 does not vary when the normal position of the piston is adjusted, due to its location within the assembly which is adjusted as a whole.

Assume next that, due to disk deflection, the disk portion opposite the friction pad moves laterally and forces the friction pad away: in this case the friction ring 36 maintains the piston 14 and sleeve 28 in fixed relationship. But it should be remembered that the frictional connection between the ring and sleeve is effective only if the force to be transmitted therethrough does not exceed the gripping force of the ring. In order to prevent the force transmitted from exceeding this value, the invention makes use of an assembly which allows the piston and sleeve to retract resiliently as a whole; this assembly includes a resilient one-way coupling in the form of spring 34 located between the stem 22 and sleeve 28 and adapted to yield as long as the retracting force exerted by the disk on the piston exceeds a predetermined value F, which should be lower than the gripping force of the friction ring on the sleeve. When the retracting force is relieved the spring brings back the piston into its original position to re-establish contact between sleeve 28 and the cross pin 32 and thereby restoring the normal brake clearance.

It may accordingly be seen that the operation of the combination automatic adjuster and deflection absorbing mechanism maintains a constant clearance "j" for the whole wear life of the friction pads of the brake. The rest position of the piston is moved toward the open end of the cylinder bore as the thickness of the lining on the friction pads decreases as a result of normal wear.

In assembling the automatic adjuster device 20, the stem 22, is fixed in place and the remainder of the structure, which has been preassembled as a unit and includes the piston 14, ring 36, tubular member 40, sleeve 28, spring 48 and washer 46 is slipped over the stem 22 and urged toward the closed end of the cylinder bore 12 compressing spring 34. The snap ring 52 is, of course removed during this time.

During assembly, the opening 53 is located to register with boss 32 so that the spring 34 is compressed until flange 30 is below the underside of the flange 32 (FIGURE 1). The piston is then turned 90° and pin 50 transmits such turning force to friction ring 36 which, acting through its frictional grip on sleeve 28 also turns the sleeve 28 through 90° thus causing the opening 53 to be crosswise with boss 32. The flange 30 is thus held by the boss 32 keeping the spring 34 compressed. Disassembly is accomplished by merely turning the piston 14 through 90° from the position shown in FIGURE 2 to register the boss 32 and opening 53 and the piston 14 and its interconnected structure is removed, leaving only the stem 22 and spring 34. The snap ring 52 is put into its place after the device 20 is assembled and is first removed before disassembly of the device 20.

While the invention has been described in considerable detail, we do not wish to be limited to the particular construction described, and it is our intention to cover hereby all novel adaptations, modifications and arrangements thereof which come within the practice of those skilled in the art to which the invention relates.

We claim:

1. In association with a fluid pressure operated brake including a cylinder having a closed end, a piston movable in the cylinder, and means for supplying pressurized fluid to the cylinder to actuate the piston, a combination automatic adjuster and deflection absorbing device comprising: a member fixedly secured to the closed end of the cylinder and extending axially of the piston, said member having stop means, a piston positioning sleeve surrounding said fixed member and extending axially of the piston, a tubular member encircling said sleeve and extending axially of the piston, said fixed stop means being engageable by said sleeve for preventing relative movement between said sleeve and said fixed member in a direction away from the closed end of the cylinder, resilient means interposed between said sleeve and the closed end of the cylinder for biasing said sleeve into engagement with said fixed stop means, an element having a frictional connection with said sleeve, an abutment fixedly secured to the piston and having a spaced apart relationship with said element, resilient means interposed between said abutment and said tubular member for urging said tubular member into engagement with said element, said frictional connection enabling relative movement between said element, said piston, and said tubular member as a unit and said sleeve when the frictional force of said connection is exceeded and operating to cause unitary movement thereof when said piston is deflected toward the closed end of said cylinder beyond the retracted position thereof.

2. In a brake or the like, a cylinder housing having a bore therein open at the forward end and closed at the rear end, a piston slidable in said bore and having a recess opening into the rear face thereof, an element having a central opening therein, fixed stop means operatively connected to the closed end of said cylinder, an elongated member extending in an axial direction of said bore through said central opening and into said piston recess, resilient means supported on said cylinder housing and normally biasing said elongated member forwardly into engagement with said fixed stop means, said piston and elongated member being relatively slidable in an axial direction, said element frictionally gripping said elongated member and defining the retracted position of said piston relative to said elongated member and bore, means coacting with said piston and said element for limiting rearward movement of said piston relative to said element and said elongated member, a lost motion thrust connection between said piston and said element to overcome the friction grip of said element on said elongated member to move said element forwardly to a new gripping position when said piston has been actuated in a forward direction further than the distance permitted by said lost motion thust connection, said piston, said element and said elongated member moving rearwardly as a unit against the force of said resilient means when said piston is deflected rearwardly beyond the retracted position of said piston.

3. In a brake or the like, a cylinder housing having a bore therein open at the forward end and closed at the rear end, a piston slidable in said bore and having a recess opening into the rear face thereof, abutment means having a central opening therein, an element having a central opening therein, fixed stop means operatively connected to the closed end of said cylinder, an elongated member extending in an axial direction of said bore through said central openings and into said piston recess, first resilient means supported on said cylinder housing and normally biasing said elongated member forwardly into engagement with said fixed stop means, said piston and elongated member being relatively slidable in an axial direction, said element frictionally gripping said elongated member and defining the retracted position of said piston relative to said elongated member and bore, means coacting with said piston and said element for limiting rearward movement of said piston relative to said element and said elongated member, said abutment means having a lost motion thrust connection with said piston and being so located to provide a thrust connection between said piston and said element for overcoming the friction grip of said element on said elongated member to move said element forwardly to a new gripping position when said piston has been actuated in a forward direction further than the distance permitted by said lost motion thrust connection, second resilient means supported on said piston and engaging said abutment means, said resilient means being so arranged to bias said abutment means into engagement with said element with said element providing a reaction support for developing force by said resilient means to retract said piston after actuation thereof, said piston, said element, said abutment means and said elongated member moving rearwardly as a unit against the force of said first resilient means when said piston is deflected rearwardly beyond the retracted position of said piston.

References Cited in the file of this patent
UNITED STATES PATENTS
2,866,526  Wiseman _____ Dec. 30, 1958